US006856735B2

(12) United States Patent
Chang et al.

(10) Patent No.: US 6,856,735 B2
(45) Date of Patent: Feb. 15, 2005

(54) TAP COUPLERS FOR FIBER OPTIC ARRAYS

(75) Inventors: Tallis Y. Chang, Northridge, CA (US); David B. Hall, La Crescenta, CA (US); Leo Lam, Woodland Hills, CA (US)

(73) Assignee: Chromux Technologies, Inc., Oxnard, CA (US)

( * ) Notice: Subject to any disclaimer, the term of this patent is extended or adjusted under 35 U.S.C. 154(b) by 64 days.

(21) Appl. No.: 10/039,838

(22) Filed: Nov. 6, 2001

(65) Prior Publication Data

US 2003/0086651 A1 May 8, 2003

(51) Int. Cl.$^7$ ................................................. G02B 6/42
(52) U.S. Cl. ............................ 385/48; 385/31; 385/50
(58) Field of Search ............................. 385/31, 44–45, 385/48, 50, 39, 42

(56) References Cited

U.S. PATENT DOCUMENTS

| | | | | |
|---|---|---|---|---|
| 4,089,583 A | * | 5/1978 | Auracher et al. | 385/31 |
| 4,134,640 A | * | 1/1979 | Auracher et al. | 385/31 |
| 4,325,605 A | * | 4/1982 | Winzer et al. | 385/44 |
| 4,480,184 A | | 10/1984 | Ely | |
| 4,540,237 A | * | 9/1985 | Winzer | 385/47 |
| 4,860,294 A | | 8/1989 | Winzer et al. | |
| 4,900,118 A | * | 2/1990 | Yanagawa et al. | 385/24 |
| 5,142,660 A | * | 8/1992 | Chang et al. | 385/10 |
| 5,214,725 A | * | 5/1993 | Yanagawa et al. | 385/45 |
| 5,390,266 A | * | 2/1995 | Heitmann et al. | 385/44 |
| 5,774,486 A | * | 6/1998 | Jiang et al. | 372/31 |
| 6,674,943 B2 | * | 1/2004 | Rider et al. | 385/43 |

FOREIGN PATENT DOCUMENTS

| | | |
|---|---|---|
| DE | 29 16 999 | 11/1980 |
| DE | 43 12 247 A1 | 10/1993 |
| EP | 0 331 337 A2 | 9/1989 |
| EP | 0 331 338 A2 | 9/1989 |
| EP | 1 133 082 A1 | 9/2001 |
| GB | 2 266 160 A | 10/1993 |
| JP | 11-84183 | 3/1999 |
| WO | PCT/US02/35439 | 8/2003 |

OTHER PUBLICATIONS

T. Sasaki, et al., "Multi–Channel Power Level Monitor with Upward–Reflector and Sensor–Array Integrated in Planar Lightwave Circuit," Optical Society of America, pp. WB6–1–WB6–3, 2000.
Y.P. Li, et al., "Silica–Based Optical Integrated Circuits," IEE Proceeding: Optoelectronics, Institution of Electrical Engineers, vol. 143, No. 5, pp. 263–280, Oct. 1996.
K. Okamoto, et al., "Fabrication of Coherent Optical Transversal Filter Consisting of MMI Splitter/Combiner and Thermo–Optic Amplitude and Phase Controllers," Electronic Letters, vol. 35, No. 16, pp. 1331–1332, Aug. 5, 1999.
M. Kawachi, "Recent Progress in Silica–Based Planar Lightwave Circuits on Silicon," IEE Proceedings: Optoelectronics, Institution of Electrical Engineers, vol. 143, No. 5, pp. 257–262, Oct. 1996.

* cited by examiner

Primary Examiner—Ellen E. Kim
(74) Attorney, Agent, or Firm—Hogan & Hartson L.L.P.

(57) ABSTRACT

A tap coupler device for an optical array is formed either in a waveguide structure or in a V block in which a fiber array may be mounted. The tap coupler device may include a substrate with main and tap waveguides formed therein, and waveguide tap couplers formed in the substrate for diverting a portion of the optical signal from the main waveguides to corresponding tap waveguides. Another variation includes a substrate including waveguides, with the surface of the substrate where the waveguides end inclined to reflect a portion of the signals in the waveguides toward the top surface of the substrate. Yet another variation includes an input V block having input fibers. The surface of the V block where the input fibers terminate is inclined to reflect a portion of light signals from the input fibers toward the top surface of the V block.

16 Claims, 11 Drawing Sheets

TAP COUPLERS FOR FIBER OPTIC ARRAYS

BACKGROUND OF THE INVENTION

1. Field of the Invention

This invention relates to optical communication and, in particular, to tap couplers suitable for sampling signals within optical devices, waveguides or fiber arrays.

2. Description of the Related Art

The control and monitoring of optical devices, networks and communication links often require extracting a small fraction of light from an optical channel. The extracted light is detected and can be used to monitor the channel for status information. It can also be used for active adjustment or equalization of the power in one channel with the power levels in other channels via a variable attenuator or active switching devices with closed loop feedback control. For example, reconfigurable OADMs (optical add-drop modules) might use power monitoring for proper optimization of express, add and drop channel throughputs and for overall power balancing within appropriate channels.

Figure 9:
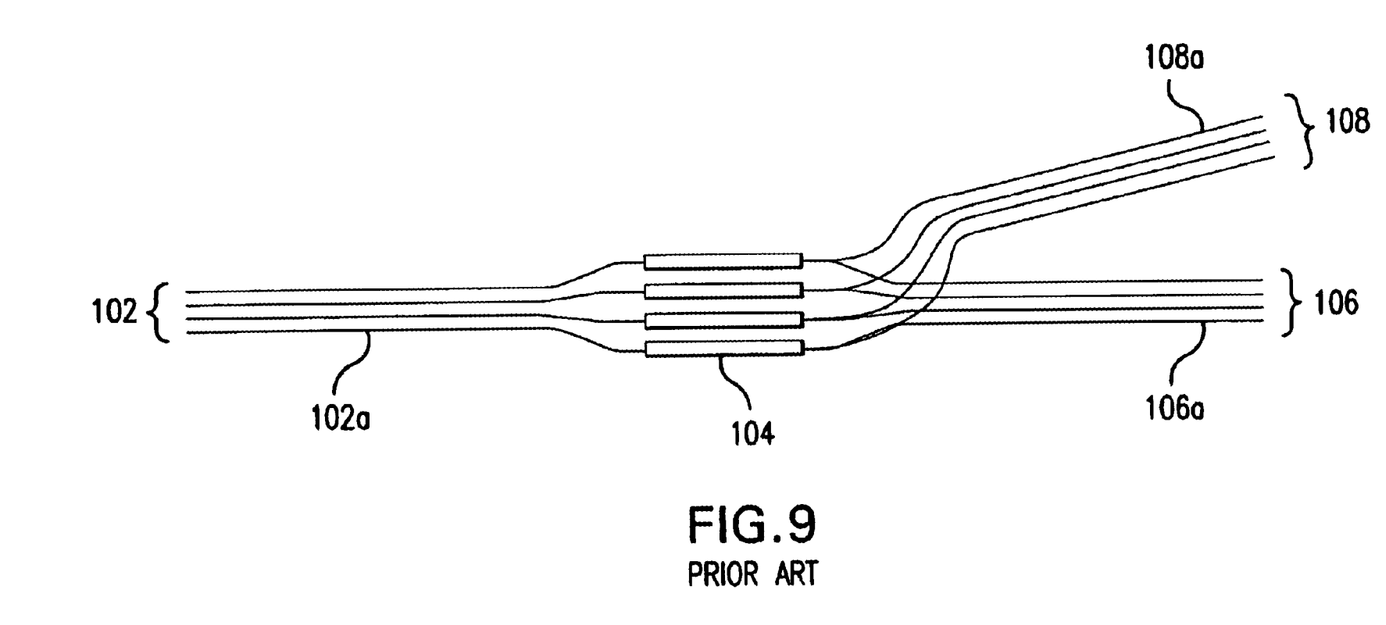
FIG. 9 shows a conventional tap coupler device using a fused biconical taper tap coupler.

A conventional method for extracting a small fraction of light from a single mode fiber uses a fused biconical taper tap coupler. FIG. 9 shows an array of fibers in a fiber optic ribbon 102, where the fibers 102a run parallel to one another with a fixed distance between adjacent fibers (channels). According to the conventional technique, the fibers 102a are separated away from the tight configuration within the fiber ribbon 102 to allow for connecting and routing of the individual fibers to the fused biconical taper tap couplers 104. Downstream from the couplers, the output fibers 106a and tapped fibers 108a are regrouped into fiber ribbons 106 and 108, respectively. The fused biconical taper tap coupler is rugged and easy to implement for one or a few fibers. Four channels and four tap couplers are shown in this drawing. However, for fiber arrays and fiber array devices such as variable optical attenuators and reconfigurable OADMs, the channel count can approach and even exceed one hundred, requiring over one hundred tap couplers for channel monitoring. In these cases the implementation of biconical taper tap couplers becomes cumbersome and costly, as the couplers have a large volume and require considerable labor for assembly.

A V block assembly is a well-known tool that can be used to terminate the array of fibers within a fiber optic ribbon and to provide access to the optical signals within the individual fiber optic channels. A V block has a substrate made of silicon, glass, ceramic or other material. The fibers extending from the fiber optic ribbon are accommodated in a series of evenly-spaced grooves formed on the substrate, and are typically attached to the V block with an adhesive such as epoxy. The end surface of the V block where the optical fibers terminate is a polished flat surface, typically AR (anti-reflection) coated to maximize optical output, and typically not perpendicular to the optical axis of the fibers to suppress retro-reflection. The polished fiber ends are precisely registered with respect to one another within the V block.

A V block assembly may be used to couple light signals into and out of a variety of optical devices, including passive and active waveguide structures, such as AWGs (arrayed waveguide gratings) and optical switches, as well as non-waveguide structures such as detector arrays. For coupling light from the V block into a waveguide structure, the polished end surface of the V block is separated by a small uniform gap from a matching end surface of the waveguide structure and its supporting substrate. The gap is either filled with air or an optically transmissive epoxy. A typical gap width is less than 20 microns. Each fiber of the V block couples light into a corresponding waveguide across the gap. Coupling losses between the output fiber and the receiving waveguide are typically low (less than 0.1 dB) Similarly, optical signals can be coupled from a waveguide structure into a V block assembly, where light exits from the waveguide, crosses a small gap and enters the array of receiving optical fibers in the V block. A waveguide optical device may be used with both an input V block and an output V block, and the number of input and output channels may be different. For example, an AWG multiplexer may have a single input channel and a plurality of output channels.

SUMMARY OF THE PREFERRED EMBODIMENTS

An aspect of the present invention provides a tap coupler device that is either formed in a waveguide structure that can be coupled to V blocks where input and output fiber arrays are mounted, or formed directly in the V block where the input fiber array is mounted. One variation of the tap coupler device includes a substrate with main and tap waveguides formed therein, and waveguide tap couplers formed in the substrate for diverting a portion of the optical signal from main waveguides to corresponding tap waveguides.

Another aspect of the invention provides a tap coupler device that includes a substrate with waveguides formed therein. The surface of the substrate near an end of the waveguides end is inclined to reflect a portion of the optical signals from the waveguides toward another surface of the substrate. Receiving fibers are mounted on that top surface to receive the reflected signals.

Yet another aspect of the invention provides a tap coupler device that includes an input V block having input fibers. The surface of the V block near an end of the input fibers is inclined to reflect a portion of light signals from the input fibers toward another surface of the V block. Receiving fibers are mounted on that surface to receive the reflected signals.

It is to be understood that both the foregoing general description and the following detailed description are exemplary and explanatory and are intended to provide further explanation of the invention as claimed.

BRIEF DESCRIPTION OF THE DRAWINGS

In the following drawings, the same or similar components are designated by the same or similar reference symbols.

FIGS. 5(a) and 5(b) show a waveguide tap coupler assembly according to another embodiment of the present invention where the tapped channels terminate before an end surface.

FIGS. 6(a) and 6(b) show a waveguide tap coupler assembly according to another embodiment of the present invention that uses end surface reflection for tapping.

DETAILED DESCRIPTION OF THE PREFERRED EMBODIMENTS

The tap coupler assemblies described here can provide power monitoring functions by tapping a fraction and preferably a small fraction of optical power from individual fiber optic channels to establish status information, channel equalization, etc. FIGS. 1–6 illustrate particularly preferred embodiments in which the tap coupler assemblies employ a waveguide structure.

Figure 1:
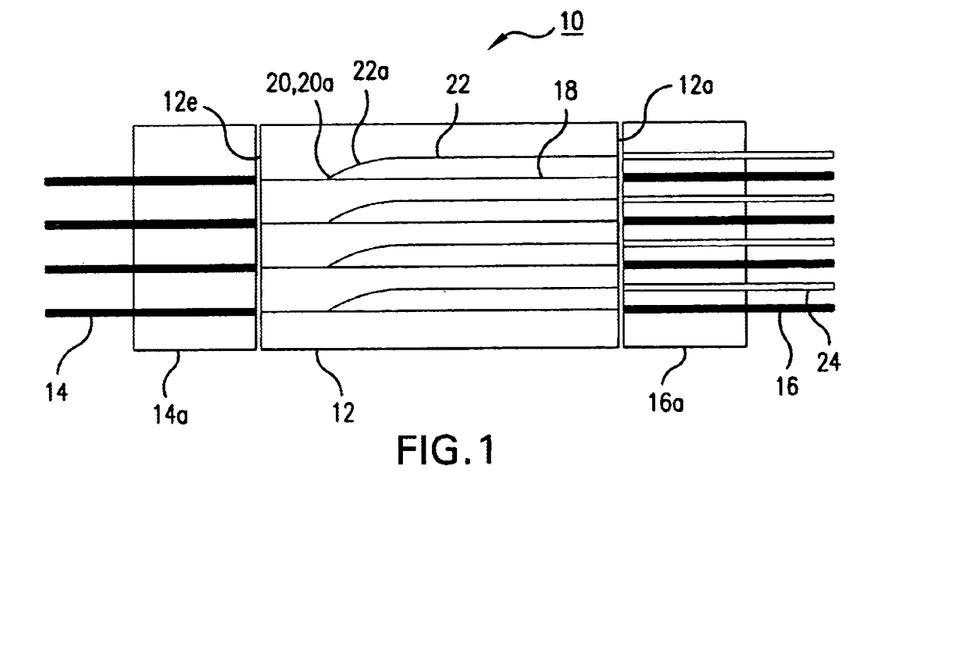
FIG. 1 shows a waveguide tap coupler assembly according to an embodiment of the present invention that employs a Y junction tap coupler.

Referring to FIG. 1, a waveguide tap coupler assembly 10 according to an embodiment of the present invention has a waveguide tap structure 12 disposed between an input V block assembly 14a and an output V block assembly 16a. The waveguide tap structure 12, shown in this drawing in a plan view, includes a substrate having throughput waveguides 18 and tap waveguides 22 formed therein. The substrate is preferably planar silica on silicon and the waveguides are preferably of germanium doped silica embedded in undoped silica to provide index matching between the input and output fibers and the waveguides. N input fiber channels 14 in the input V block 14a (N=4 is shown in FIG. 1 as an example) are coupled to an array of N main or throughput waveguides 18, which are in turn coupled to N output fiber channels 16 in the output V block 16a. The input or entrance surface 12e and output or exit surface 12a of the waveguide tap structure 12 is preferably polished, coated, or otherwise treated to maximize power coupling between the wave guide tap structure 12 and the input and output V blocks 14a, 16a.

Within the waveguide tap structure 12, each throughput waveguide 18 is preferably coupled to a waveguide tap coupler 20 that diverts a fraction of the light into an auxiliary or tap waveguide 22. The N tap waveguides 22 are coupled to N tap output fiber channels 24 in the output V block 16a for power monitoring or other purposes. In this embodiment, the plurality of tap waveguides 22 alternate with the plurality of throughput waveguides 18 in a spatial arrangement within the waveguide structure 12. All throughout and tap waveguides 18 and 22 extend to the far end (the output end) 12a of the waveguide tap structure 12 in this illustration, where their power outputs are coupled into the receiving optical fibers 16 and 24, respectively. Within the output V block 16a, half the fibers (fibers 16) are for receiving the throughput channels and the other half (fibers 24) are for receiving the tap channels. Although the input, output, throughput, and tap channels are shown in FIG. 1 in sets of four, the numbers of these fibers or waveguide channels may be any suitable numbers and do not have to match each other. Preferably, the fibers 14 and 16 and the waveguides 18 and 22 are single mode fibers or waveguides, although the invention is not limited to such devices.

The waveguide tap coupler 20 shown in FIG. 1 is a Y junction tap coupler that employs an asymmetric Y junction 20a that connects the throughput and tap waveguides 18 and 22. The angle between the throughput and tap waveguides at the Y junction is preferably large enough to minimize the power loss from the throughput channel, yet small enough to extract the required power for the tap channel. The power diverted to the tap waveguide 22 is typically less than the power lost from the throughput waveguide 18 due to radiation losses in the vicinity of the Y junction 20a. The Y junction 20a may be designed to tap off a desired amount of power by using a calculation method. Design software, such as software from Rsoft, Inc. based on the beam propagation method (BPM), may be used for such calculations. In one example, both the throughput and the tap waveguide are single mode waveguides having a 6 by 6 micron square cross-section with a refractive index change (delta) of 0.01 between the guide and the surrounding cladding. In this configuration, an 8° branch angle for the Y junction yields a tap of about 2% and a throughput of about 96%, whereas a 10° branch angle yields a tap of about 1% and a throughput of about 93%. The excess radiation losses are about 2% for the 2% tap and about 6% for the 1% tap.

In the waveguide tap structure 12, each throughput waveguide 18 is preferably straight, and each tap waveguide 22 follows a curved trajectory 22a for a distance beyond the Y junction 20a. Beyond this curve, the tap waveguide 22 is preferably straight and parallel to the throughput waveguide 18. BPM calculations indicate that a 5 mm radius of curvature on the curved path 22a introduces an additional less of less than 0.02%, which may be considered negligible. Preferably, the waveguide cross-section and core refractive index are chosen to minimize bending loss as well as to maximize mode matching with standard single mode (e.g. SMF 28) fiber at the input and output ends of the waveguides.

Figure 2:
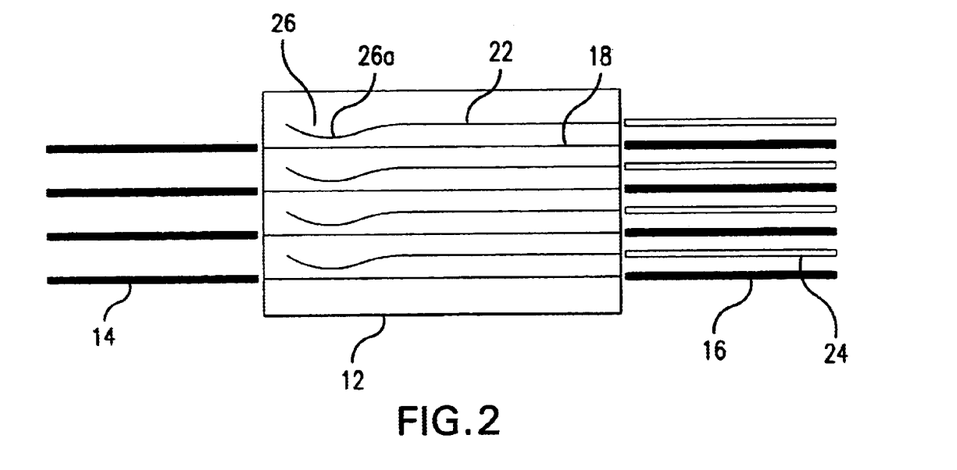
FIG. 2 shows a waveguide tap coupler assembly according to another embodiment of the present invention that employs a directional tap coupler.

FIG. 2 shows a waveguide tap coupler assembly according to another embodiment of the present invention. For simplicity, the input and output V block assemblies are not shown in this and subsequent drawings; only the input and output fiber optic channels 14 and 16 are shown. The embodiment of FIG. 2 is similar to that of FIG. 1, but employs directional tap couplers 26 instead of Y junction tap couplers for tapping off power from the throughput waveguides 18. To form a directional tap coupler 26, the tap waveguide 22 runs in an arc that approaches but does not cross the throughput waveguide 18. At the point of closest approach 26a, both waveguides run approximately parallel to one another to allow evanescent coupling of power from the throughput waveguide 18 to the tap waveguide 22. After sufficient coupling has occurred, the tap waveguide 22 angles away from the throughput waveguide 18 so that additional optical signal is not removed from the throughput waveguide.

The amount of tap coupling is a function of the distance of closest approach of the tap waveguide to the throughput waveguide, and may be designed using BPM calculations. For example, when both the throughput and the tap waveguides 18 and 22 have a 6×6 micron cross-section and an index delta of 0.01, and when the radius of curvature of the tap waveguide 22 is 5 mm, a tap of about 1% is obtained with a gap of 10.8 microns at the point of closest approach between the centers of the throughput and the tap waveguides. About 98.9% of the power remains in the throughput waveguide as throughput power with an excess loss of 0.1%. In another example, the throughput and tap waveguides have a 8×8 micron cross-section and an index delta of 0.007, and a tap of about 1% is obtained at a nearest spacing of 12.2 microns with about 98.7% throughput and 0.3% excess loss. These excess losses are considerably less than the excess losses for the asymmetric Y junction tap couplers shown in FIG. 1. The amount of coupling is sensitive to the distance of closest approach. For example, the coupling may double from about 1% to 2% when the distance of closest approach is reduced by one micron, or may be halved from about 1% to 0.5% when the distance of closest approach is increased by one micron. In practice, control of waveguide dimensions and distances between adjacent waveguides to within one-quarter micron are typically adequate to obtain desired coupling ratios on the order of 1% with acceptable accuracy.

Figure 3:
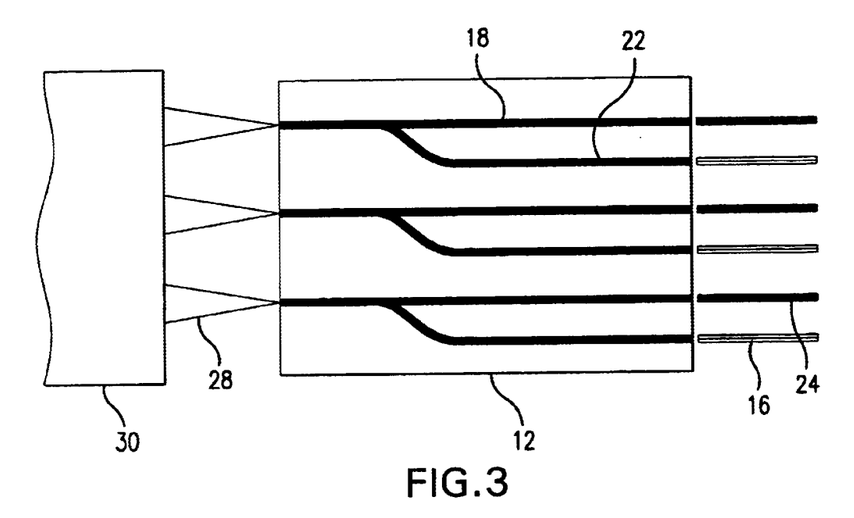
FIG. 3 shows a waveguide tap coupler assembly according to another embodiment of the present invention that is adapted to receive focused input beams.

FIG. 3 shows a waveguide tap coupler assembly according to another embodiment of the present invention. This embodiment is similar to that of FIG. 1, except that the waveguide tap structure 12 is adapted to receive input signals in the form of focused light beams 28 from a collimator array 30 directed into the throughput channel waveguides 18. In one particular application, a steering array of mirrors (not shown) is disposed upstream of the collimator array, which can be used in, for example, a crossbar switch. The detected power from the tap waveguides 22 may then be used to adjust the various turning angles of the mirrors for channel equalization or other adjustments of optical power ratios among the different mirrors.

Figure 4A:
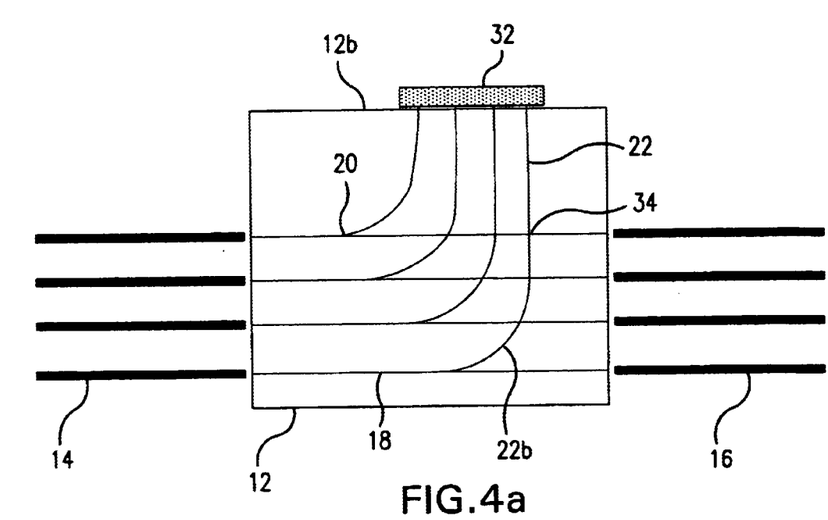
FIGS. 4(a) and 4(b) show waveguide tap coupler assemblies according to another embodiment of the present invention where the tapped channels are directed to a side surface.

FIG. 4(a) shows a waveguide tap coupler assembly according to another embodiment of the present invention. This embodiment is similar to that of FIG. 1, except that downstream from the tap coupler 20, the tap waveguides 22 curve away from the throughput waveguides 18 to end up in trajectories at approximately 90° to the throughput waveguides. The tap waveguides 22 terminate on a side surface 12b of the waveguide tap structure 12, where their outputs may be received by a detector array 32 or other suitable optical devices disposed near that surface.

In the configuration illustrated in FIG. 4(a), each tap waveguide 22 (except for the one closest to the side surface 12b) crosses one or more throughput waveguides 18 (up to three in this example). At each crossing point 34 for a throughput waveguide and a tap waveguide, a small fraction of the light in the tap waveguide is coupled into the main waveguide and vice versa. This undesired effect is referred to as crosstalk. In addition, a small fraction of light in either waveguide entering the crossing point is lost to radiated power, which lowers the downstream power levels of both the main and tap channels. Multiple crossings of one waveguide with others increase the amounts of crosstalk and power loss. These unwanted effects may be minimized if the crossing angle is at or near 90°. BPM calculations for two waveguides of 6 by 6 micron cross-sections and a refractive index delta of 0.01 indicate that at a 90° crossing angle, a power loss is about 0.4% and a crosstalk is less than $10^{-7}$. At a crossing angle of 27°, the power loss is about 1.3% and the crosstalk is about $3 \times 10^{-5}$. Typically, due to space constraints, the crossing angle at the first crossing point for a tap waveguide may be less than 90°, while the crossing angles at subsequent crossing points may preferably be made at or near 90°. Thus, to minimize the undesirable cross talk and power loss effects, it is desirable to ensure that the first crossing point for each tap waveguide has a sufficiently large angle within the practical limitations of a usable device. This angle is a function of the radius of curvature of the curved section 22b of each tap waveguide 22 and the lateral spacing between adjacent throughput waveguides 18. In one example, BPM calculations for a waveguide tap structure with 16 parallel waveguides and a 500 micron spacing show that, using a 5 mm radius of curvature for the tap waveguides and a Y junction branching angle of 9°, the crosstalk for the worst case throughput waveguide crossed by 15 tap waveguides is about $3 \times 10^{-5}$ and the excess power lost to the 15 crossings is about 7%.

Figure 4B:
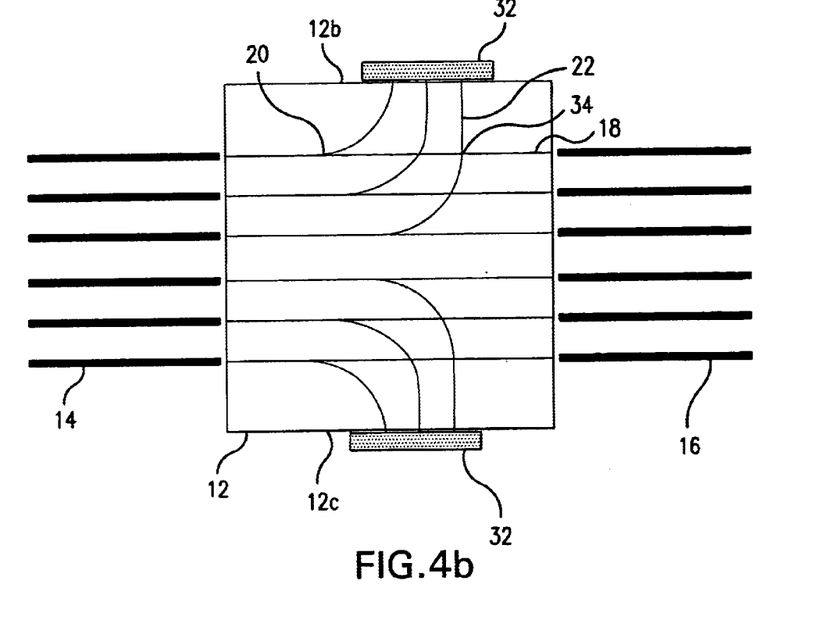

FIG. 4(b) shows a double-sided variation of the structure of FIG. 4(a), where the tap waveguides 22 bend toward and terminate at both side surfaces 12b and 12c of the waveguide tap structure 12. This reduces the number of crossings of the throughput and tap waveguides, thereby reducing crosstalk and excess power loss. In the example of FIG. 4(b), a total of six throughput channels are present, where three tap waveguides 22 terminate on each side surface of the waveguide tap structure 12 with a maximum number of two crossings.

Figure 5A:
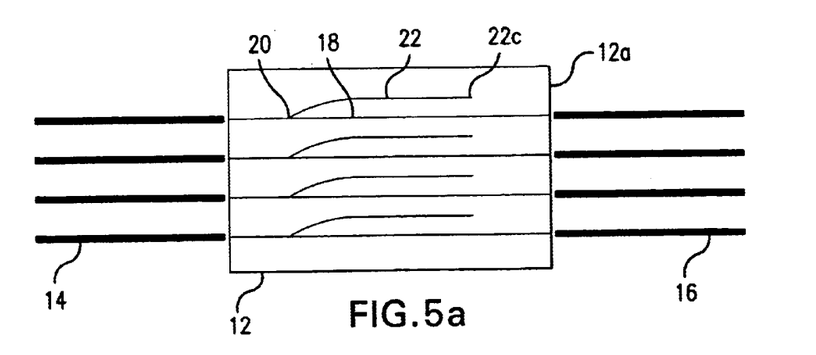
FIG. 5(a) is a top view and FIG. 5(b) is a side cross-sectional view.
Figure 5B:
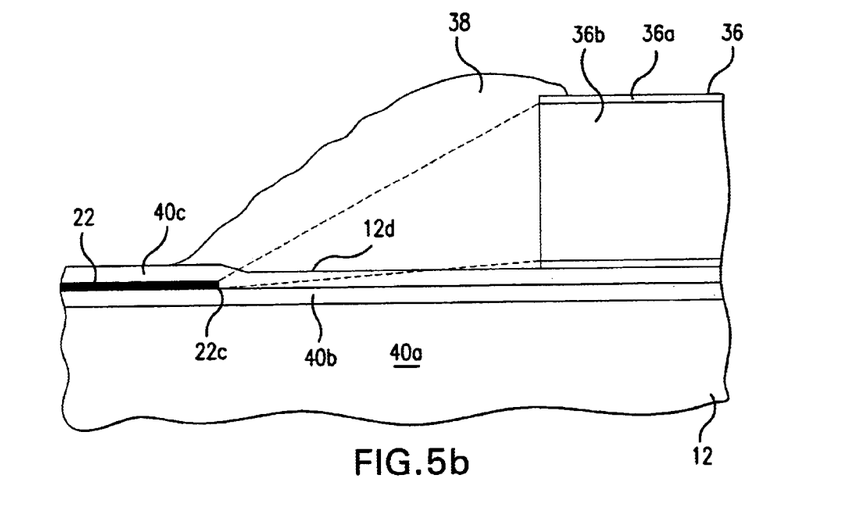

FIG. 5(a) shows a waveguide tap coupler assembly according to another embodiment of the present invention. This embodiment is similar to that of FIG. 1, except that the tap waveguides 22 terminate within the waveguide tap structure 12 before they reach the end surface 12a. Power is radiated from the waveguide terminations 22c to be collected and detected. Collection and detection of the radiated power may be done by a detector placed in close proximity to the termination 22c of the wave guide. Alternatively, the radiated power may impinge on a receiving fiber, preferably a multimode fiber with a large core and high collection efficiency, which acts as light pipe to transport the light to a remote location for detection. FIG. 5(b) is an enlarged cross-sectional view of a multimode fiber collector for this embodiment, viewed from a direction parallel to the top surface of the waveguide tap structure 12 and perpendicular to the waveguides 22. The waveguide tap structure 12 is shown to have a silicon substrate 40a, a silica substrate layer 40b formed on the silicon substrate, a germanium doped silica waveguide 22, and a silica superstrate layer 40c formed over the waveguide 22 and the substrate layer 40b. Other suitable materials may also be used to form the substrate and waveguide. The multimode receiving fiber 36 is disposed on the top surface 12d of the waveguide tap structure 12, and at least the end portion is substantially parallel to the tap waveguide 22. The end surface of the receiving fiber faces the termination (end) 22c of the tap waveguide and is located at a suitable distance away from the waveguide end. The multimode fiber 36 is secured into place over the top surface 12d with an optical grade adhesive 38 such as epoxy or gel. Calculations indicate that a large core multimode fiber 36 having a thin cladding 36a and a 200 micron diameter core 36b located 1.5 mm away from the waveguide tip 22c can collect and propagate about 25% of the incident light. The dashed lines in this figure indicate a light cone from the waveguide 22 intercepted by the core of the multimode fiber 36.

Figure 6A:
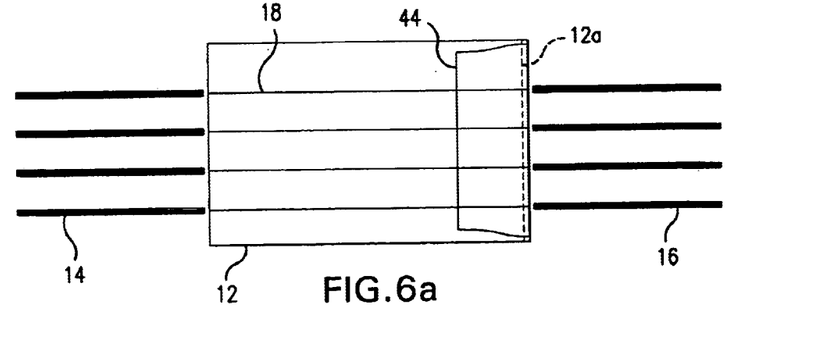
FIG. 6(a) is a top view and FIG. 6(b) is a side cross-sectional view.
Figure 6B:
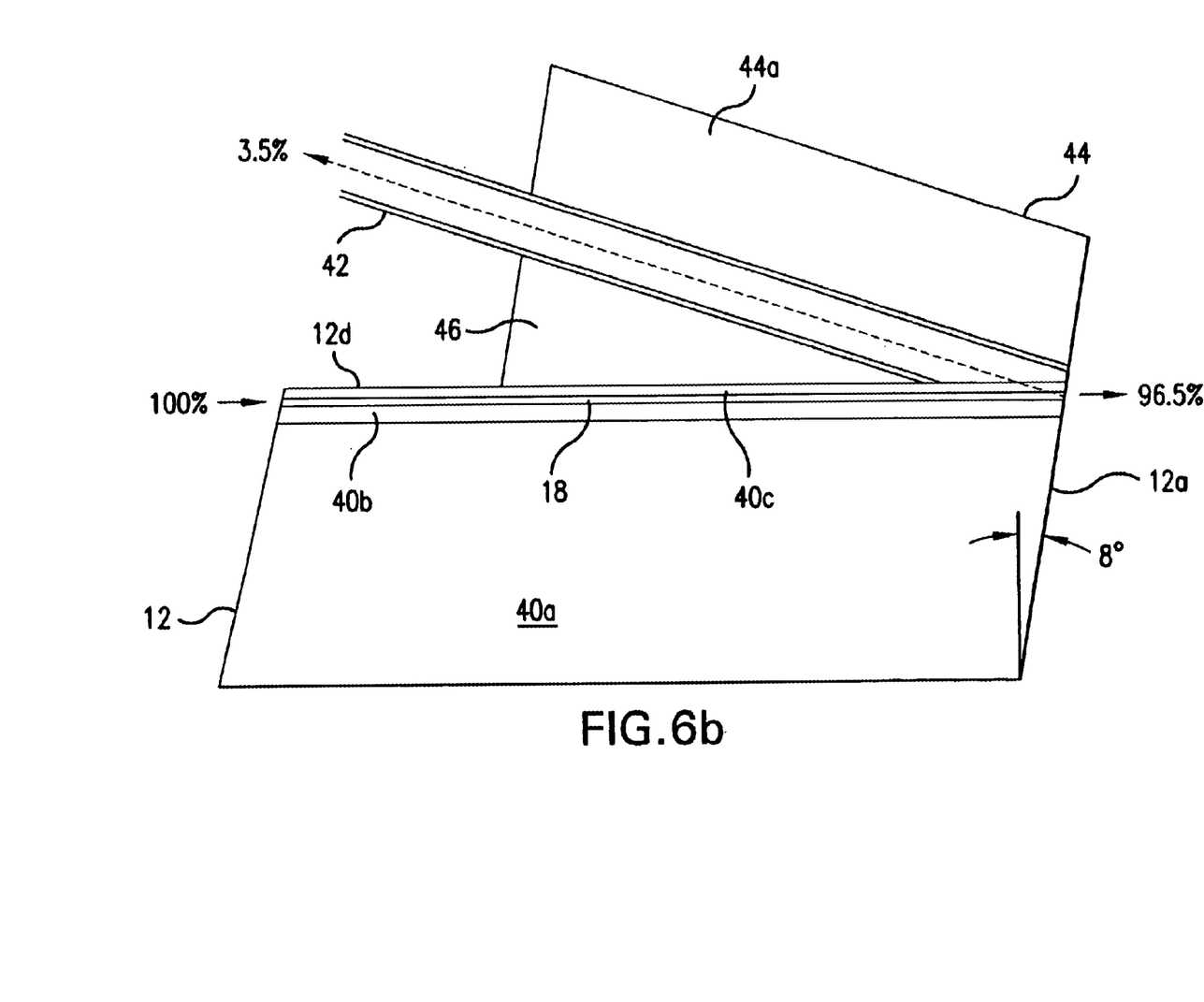

FIGS. 6(a) and 6(b) illustrate a waveguide tap coupler assembly according to another embodiment of the present invention. Instead of a waveguide tap coupler 20 or 26 as shown in the embodiments of FIGS. 1 or 2, this embodiment employs end surface reflection to extract the light from the throughput channels. As shown in FIG. 6(a), the throughput waveguides 18 extend the entire length of the waveguide tap structure 12 with no waveguide taps. The end surface 12a of the waveguide tap structure 12 where the light exits the waveguides 18 is inclined at an angle (preferably on the order of eight degrees) with respect to a plane perpendicular to the waveguides 18. Such an inclination is often provided for the exit surface in conventional waveguide structures to avoid retro-reflected light. In conventional devices, this end surface is usually anti-reflection (AR) coated or covered with an index matching glue to maximize light throughput from the waveguide to the receiving fiber. In the waveguide tap coupler device of the present embodiment, however, the end surface 12a is preferably not AR coated, so that an appropriate amount of light may be reflected upward toward the top surface 12d to be collected as tapped power. For example, about 3.5% of the incident light may be reflected at an angle of 16° with respect to the top surface of the waveguide tap structure when the end surface 12a is inclined at 8°.

FIG. 6(b) is an enlarged cross-sectional view of a light collection structure for this embodiment, viewed from a direction parallel to the top surface of the waveguide tap structure 12 and perpendicular to the waveguides 18. Light from the waveguide 18 is reflected at the inclined end surface 12a into a multimode fiber 42, which is part of a V block assembly 44 disposed on the top surface 12d of the waveguide structure 12. The V block assembly 44, preferably formed as a separate unit from the waveguide structure 12, includes a substrate 44a, one or more multimode receiving fibers 42 accommodated therein, and a block 46 made of pyrex or other materials. The V block assembly 44 is attached to the top surface 12d of the waveguide structure 12 by an adhesive or other suitable attachment methods, with the block 46 disposed between the receiving fibers 42 and the waveguide structure 12. The block 46 is polished at a 16° angle so that the receiving fiber 42 forms an appropriate angle with the waveguide 18. The exit surface 12a of the waveguide 12 is polished to reflect the light from the waveguide 18 into the receiving fibers 42. Preferably, the multimode receiving fiber 42 has a large core size and a high numerical aperture (NA), so that the positioning requirements in the single mode to multimode fiber registration may be relaxed without compromising the light coupling efficiency. For example, the multimode fiber 42 may have a cladding diameter of 125 to 200 microns and a core diameter of 105 to 220 microns with a numerical aperture of 0.26.

Figure 7A:
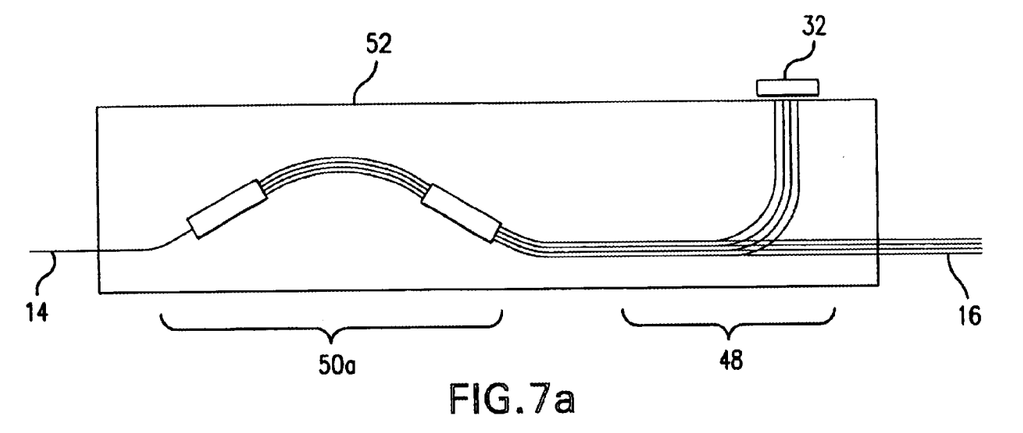
FIGS. 7(a) and 7(b) show multipurpose single waveguide devices incorporating waveguide tap couplers according to another embodiment of the present invention.
Figure 7B:
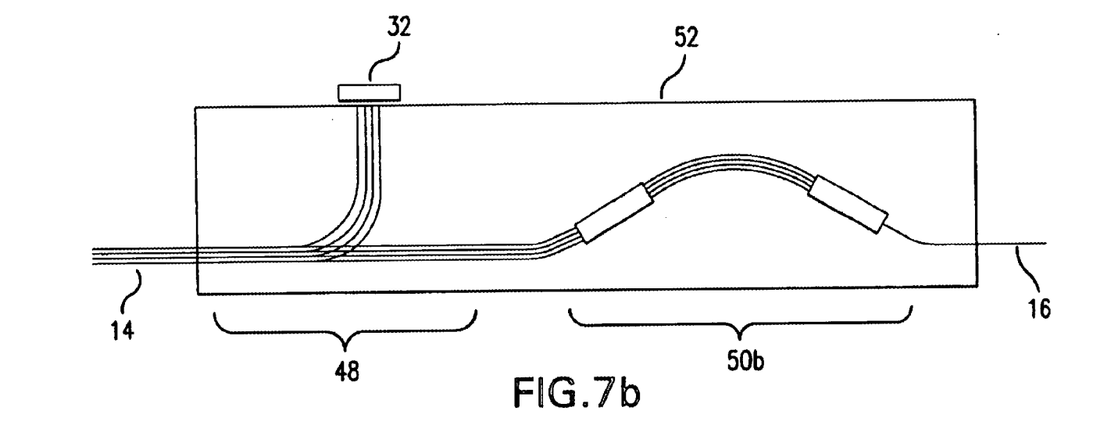

The waveguide tap coupler 12 described above may be combined with other optical waveguide elements to construct a compact multipurpose single waveguide device. Such single waveguide structures may be used for power tapping in addition to other functions such as active switching, multiplexing and demultiplexing of multiple fiber optic channels, with reduced device volume and increased versatility. Two examples of such multipurpose devices are shown in FIGS. 7(a) and 7(b). In FIG. 7(a), an AWG demultiplexer 50a and a tap coupler 48 are formed in a single waveguide chip 52. The demultiplexer 50a has one input waveguide channel and a plurality (four in this example) of output waveguide channels, and each of the output waveguide channels is tapped downstream. A detector array or other suitable device 32 may be used for power monitoring or other desired control functions. Similarly, FIG. 7(b) shows a tap coupler 48 and an AWG multiplexer 50b formed in a single waveguide chip 52. Each of the plurality of input waveguide channels of the multiplexer 50b is tapped upstream from the multiplexer. The devices 50a, 50b in FIGS. 7(a) and 7(b) are merely examples; any suitable optical waveguide elements may be formed with the tap coupler to form a single waveguide multipurpose device.

FIGS. 8(a)–8(d) illustrate a tap coupler assembly according to yet another embodiment of the present invention. This structure uses a pair of V blocks, including an input V block 54 accommodating a plurality of input fibers 56 and an output V block 16a accommodating a plurality of output fibers 16. Power is directly tapped from the input fibers 56 at an inclined end surface 54a of the input V block 54, which reflects light from the input fiber 56 upward into a collection structure to be collected and detected. The entrance surface of the output V block 16a may be AR-coated to maximize fiber to fiber throughput. Since the input V block 54 itself is used as a tap structure, this embodiment eliminates the need for a separate waveguide tap structure and further reduces device size.

Figure 8A:
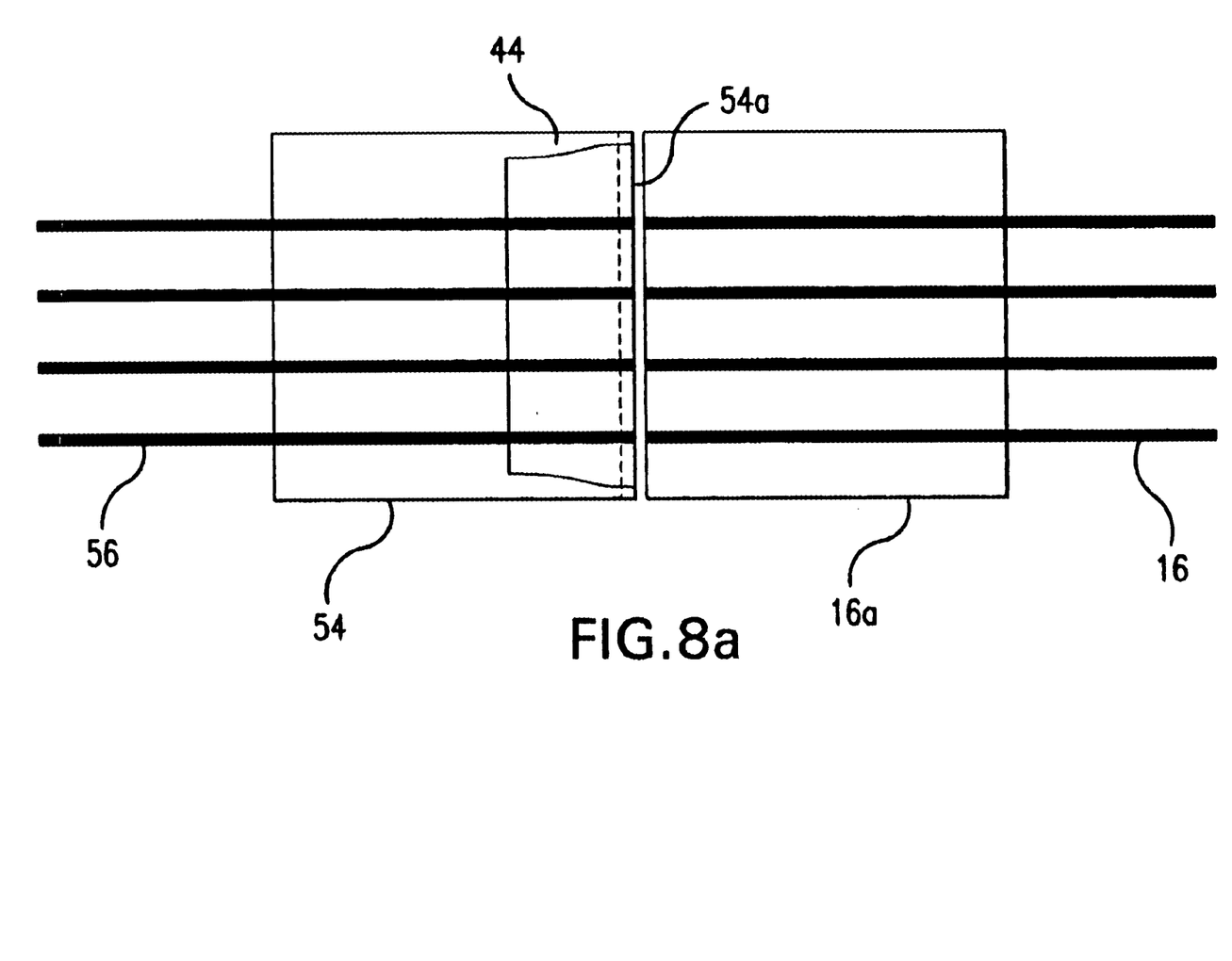
FIGS. 8(a)–8(d) show a tap coupler assembly according to another embodiment of the present invention that uses end surface reflection for tapping.
Figure 8B:
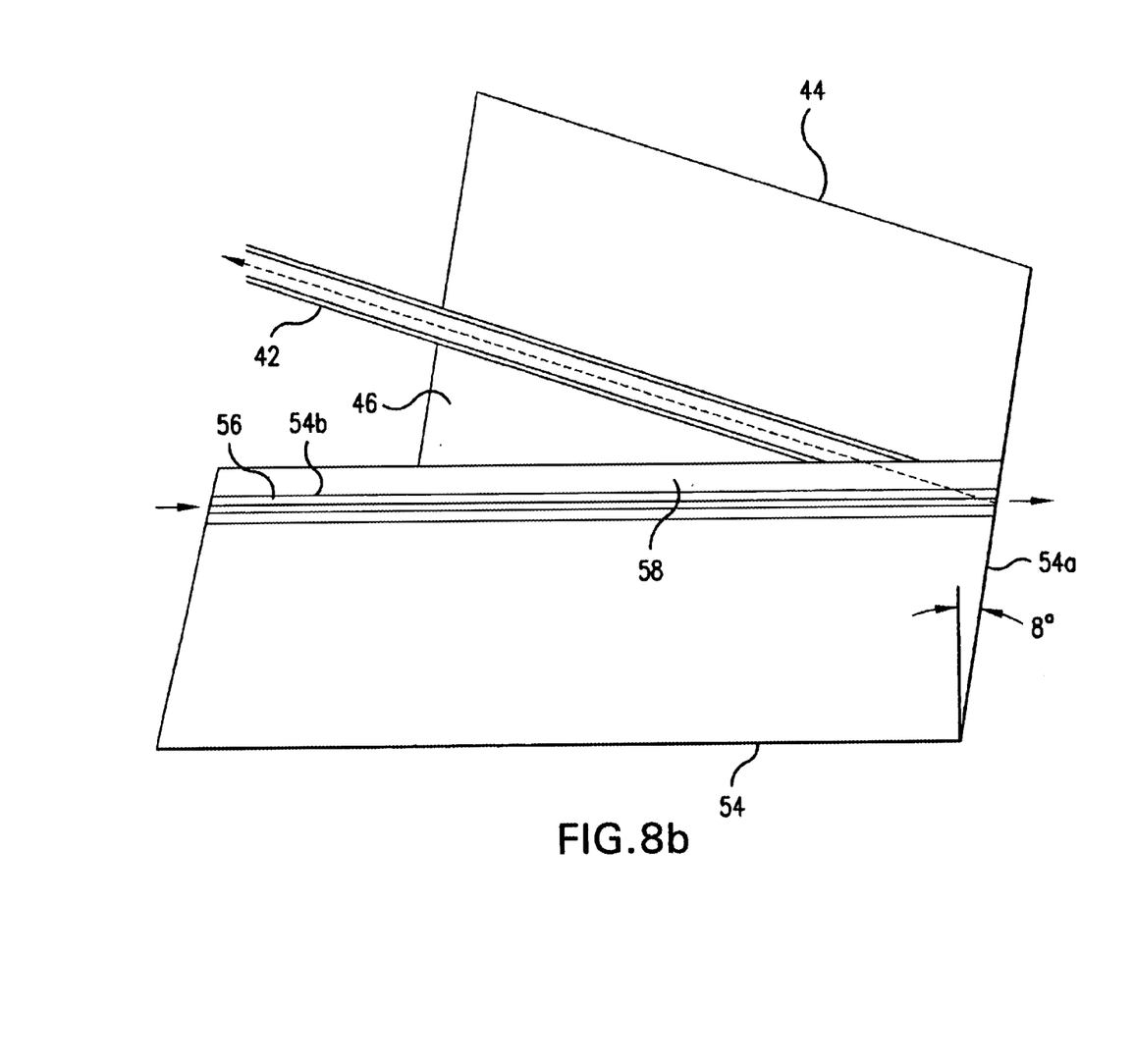

FIG. 8(b) is an enlarged cross-sectional view of the input V block 54 and the power collection structure, viewed from a direction parallel to the top surface of the input V block and perpendicular to the fibers 56. The power collection structure is similar to that shown in FIG. 6(b), and includes a receiving V block 44, one or more multimode receiving fibers 42, and a Pyrex™ block 46. Other optically transparent and thermally stable materials might, of course, be used for any of the block 46 and the spacer 58. A thin glass spacer 58 is attached to the top surface 54b of the input V block 54 over the fiber 56. Other optically transparent and thermally stable materials might, of course, be used for any of the block 46 and the spacer 58. This glass spacer provides a flat surface to which the polished Pyrex™ block 46 can be mounted.

Figure 8C:
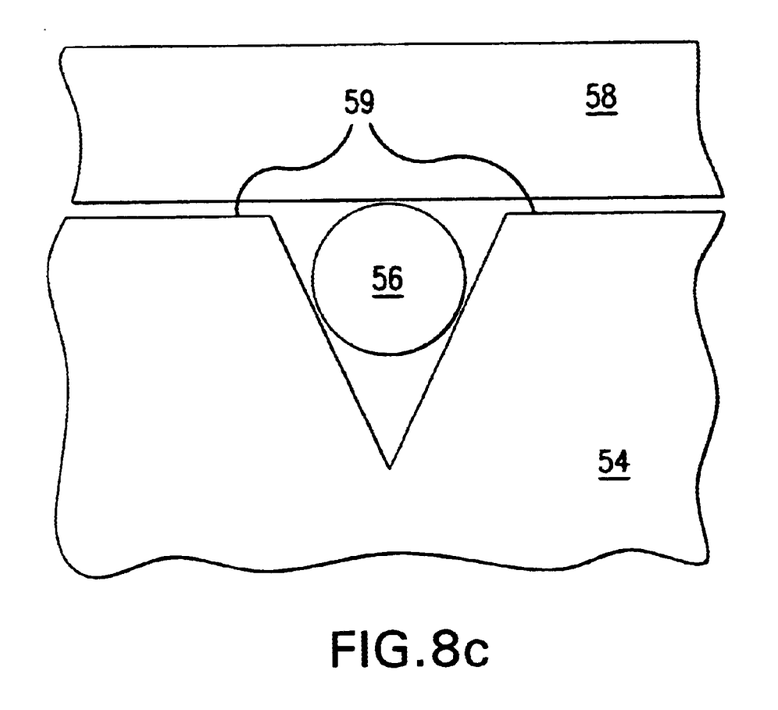

It should be noted that typical implementations might not hold the spacer 58 in direct contact with the upper surface of the V block 54. Rather, the system may be configured so that the spacer is intended to rest on an upper surface of a fiber 56 with epoxy or another adhesive filling the space (if any) between the upper surface of the V block 54 and the lower surface of the spacer 58. This configuration is illustrated in FIG. 8(c), which illustrates a possible cross section through a portion of the assembly of FIGS. 8(a) and 8(b). In this illustration, the uppermost extent of the fiber 56 extends above the adjacent upper surfaces of the V block 54. The lower surface of the spacer 58 rests against the fiber 56 and holds it in place within the V groove of the block 54. Epoxy (not shown) or a similar rigid and thermally stable adhesive fills at least a portion of the spaces 59 between the spacer 58 and V block 54 to hold the structure in fixed position.

Figure 8D:
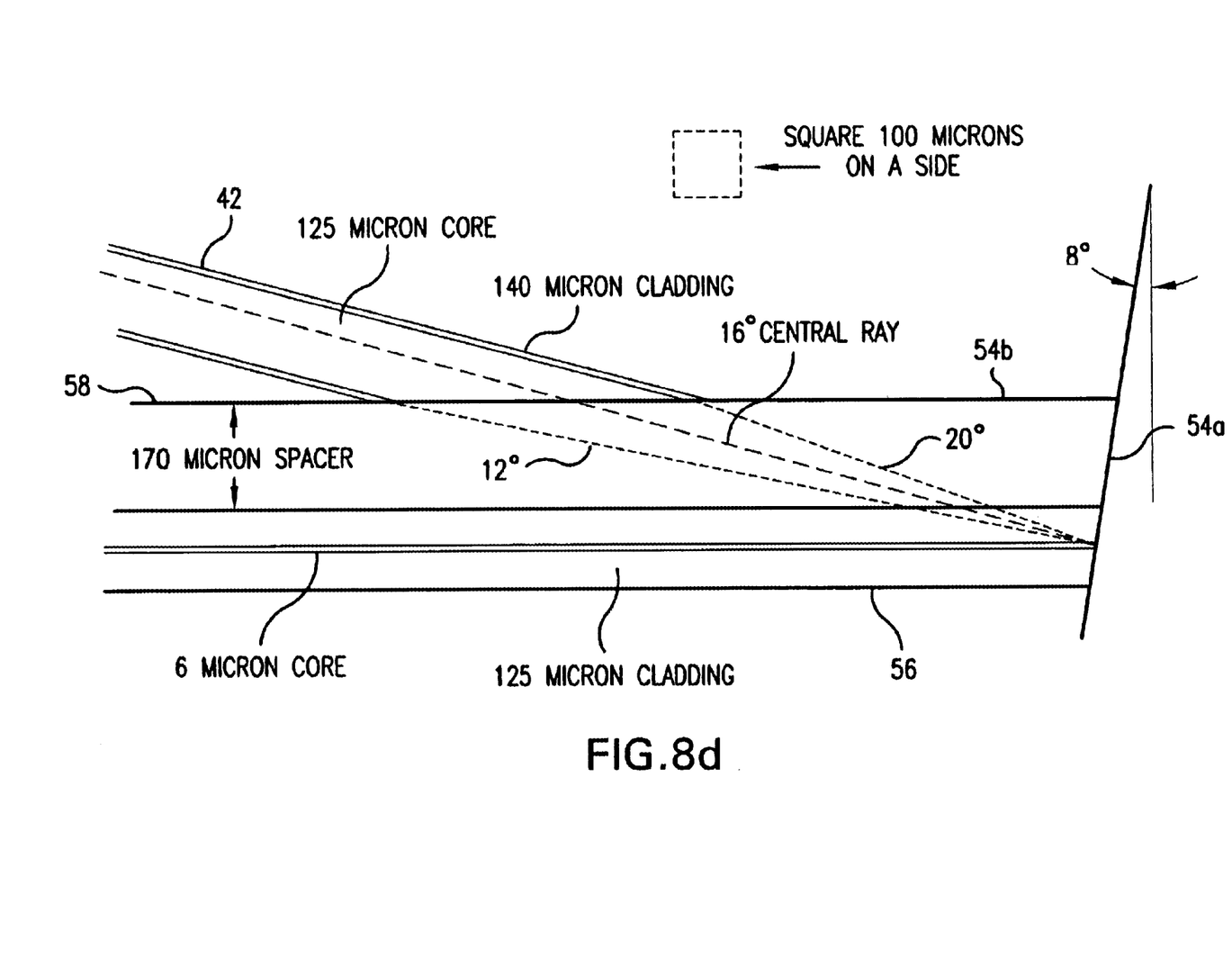

A partial and approximately scaled view of an exemplary tap structure according to this embodiment is shown in FIG. 8(d) to illustrate coupling efficiency. The multimode receiving fiber 42 has a 140 micron cladding diameter and a 125 micron core diameter. The spacer 58 has a thickness of 170 microns, which is a typical thickness for a microscope cover glass. The input single mode fiber 56 has a 125 micron cladding diameter and a 6 micron core diameter. The AR-uncoated exit surface 54a inclines at 8° from a plane normal to the input fiber 56, and reflects about 3.5% of the incident light toward the receiving fiber 42. With this geometry, the receiving fiber 42 collects about 90% of the incident light and guides it to a detector at the other end of the receiving fiber. Increasing the core diameter of the receiving fiber 42 and/or reducing the thickness of the spacer 58 will generally increase the collection efficiency and further relax the tolerances for alignment.

In the tap coupler assembly of FIG. 8(a), only one gap is present in the signal path between the input and output fibers, i.e., the gap between the input V block 54 and output V block 16a. In the tap coupler assembly of FIG. 1, on the other hand, two gaps are present, one between the input V block 14a and the waveguide tap structure 12, the other between the waveguide tap structure 12 and the output V block 16a. Since throughput loss occurs each time the light signal crosses a small gap when exiting one fiber or waveguide and entering another, the tap coupler device of FIG. 8(a) has a relative advantage of lower throughput loss over the device of FIG. 1.

Various embodiments of the present invention have been described above. A tap coupler assembly according to the invention may generally have any combination of the above-described features. For example, the power tapping mechanism may employ either a Y junction tap coupler as shown in FIG. 1 or a directional tap coupler as shown in FIG. 2, or may use the end surface reflection mechanism as shown in FIG. 6(a) and 6(b). The tap waveguides may extend to the end surface of the waveguide tap structure as shown in FIGS. 1 and 2, or curve away to terminate on a side surface thereof as shown in FIGS. 4(a) and 4(b), or terminate inside the waveguide tap structure before reaching the end surface as shown in FIGS. 5(a) and 5(b). The input to the waveguide tap structure may use either an input V block as shown in FIG. 1 or an array of focused beams as shown in FIG. 3. In addition, any of the above features may be used in a multipurpose single waveguide devices that incorporates a tap coupler and other optical elements as shown in FIGS. 7(a) and 7(b).

It will be apparent to those skilled in the art that various modifications and variations can be made in a tap coupler and related method of the present invention without departing from the spirit or scope of the invention. For example, the V blocks and the waveguide structures may be formed of any suitable materials. The waveguides and the optical fibers may have any suitable dimensions depending on the application in which they are employed. Further, although V blocks are described as a preferred means to couple optical signals between input or output fibers and the waveguides of the tap coupler structure, any other suitable means may be employed, so long as they function to securely position the plurality of optical fibers and provide registration between the fibers and the waveguides with acceptable precision. Such input and output devices may be generally referred to as input blocks and output blocks in the context of this invention. Thus, it is intended that the present invention cover modifications and variations that come within the scope of the appended claims and their equivalents.

What is claimed is:

1. A tap coupler device comprising:
   a substrate having one or more waveguides therein for carrying optical signals, each waveguide having an output end on an output surface of the substrate for emitting the optical signals from the waveguide into free space, wherein the output surface of the substrate including the output ends of the waveguides is inclined with respect to a plane normal to a direction of the waveguides at the output surface for reflecting a portion of the optical signals from the waveguides toward a top surface of the substrate; and
   one or more receiving optical fibers mounted on the top surface of the substrate, each receiving fiber being disposed at an angle with respect to the top surface and having an end disposed near the output end of a waveguide for receiving the portion of the optical signals reflected from the output end of the waveguide, the one or more receiving optical fibers acting as taps for the tap coupler device.

2. The tap coupler device of claim 1, further comprising a receiving block for mounting the receiving fibers, wherein the receiving fibers are held fixed in the receiving block and the receiving block is attached to the top surface of the substrate.

3. The tap coupler device of claim 1, wherein the receiving fibers are multimode fibers.

4. The tap coupler device of claim 3, wherein cores of the receiving fibers are larger than cross sections of the input waveguides.

5. The tap coupler device of claim 1, wherein the output surface of the substrate including the output ends of the waveguides is free from anti-reflection coating.

6. The tap coupler device of claim 1, wherein the waveguides are single mode waveguides.

7. The tap coupler device of claim 1, wherein the portion of the optical signal reflected toward the top surface of the substrate is less than about three percent of power in the waveguide.

8. A tap coupler device of claim 1 further comprising:
   an output block which includes a substrate and one or more output optical fibers accommodated in the substrate, each output fiber having an input end disposed on an input surface of the output block, wherein the output block is disposed such that its input surface faces the output surface of the substrate of the tap coupler device to provide registration between the input ends of the output fibers and the output ends of the waveguides for coupling optical signals from the waveguides to the output fibers.

9. A tap coupler device comprising:
   an input block including a substrate holding fixed therein one or more input optical fibers, each input fiber having an output end disposed at an output surface of the input block for emitting optical signals from the input fiber into air, wherein the output surface of the substrate including the output ends of the input fibers is inclined with respect to a plane normal to the direction of the input fibers at the output surface for reflecting a portion of the optical signals from the input fibers toward a toP surface of the substrate; and
   one or more receiving optical fibers mounted on the top surface of the substrate, each receiving fiber being disposed at an angle with respect to the top surface and having an end disposed near the output end of an input fiber for receiving the portion of the optical signals reflected from the output end of the input fiber.

10. The tap coupler device of claim 9, further comprising a receiving block for mounting the receiving fibers, wherein the receiving fibers are held fixed in the receiving block and the receiving block is attached to the top surface of the substrate.

11. The tap coupler device of claim 10, wherein cores of the receiving fibers are larger than cores of the input fibers.

12. The tap coupler device of claim 9, wherein the receiving fibers are multimode fibers.

13. The tap coupler device of claim 9, wherein the output surface of the substrate including the output end of the input fibers is free from anti-reflection coating.

14. The tap coupler device of claim 9, wherein the input fibers are single mode fibers.

15. The tap coupler device of claim 9, wherein the portion of the optical signal reflected toward the top surface of the substrate is less than about three percent of power in the input fiber.

16. The tap coupler device of claim 9 further comprising:
   an output block which includes a substrate and one or more output optical fibers held fixed with respect to the substrate, each output fiber having an input end disposed at an input surface of the output block, wherein the output block is disposed such that its input surface faces the output surface of the substrate of the tap coupler device to provide registration between the input ends of the output fibers and the output ends of the input fibers for coupling optical signals from the input fibers to the output fibers.

* * * * *